Sept. 14, 1965    R. K. TRINKLE    3,205,602
ANIMAL MARKING DEVICE AND METHOD OF APPLYING SAME
Filed Nov. 5, 1962
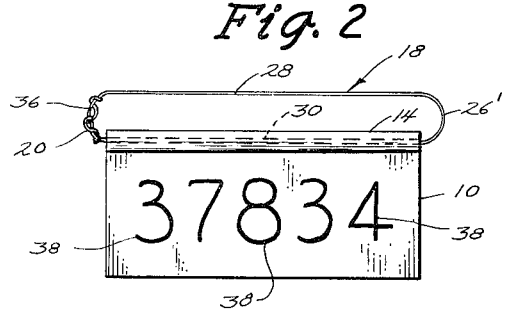
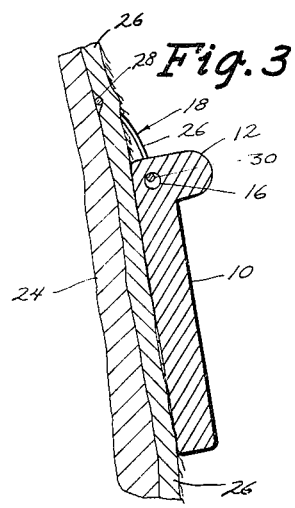
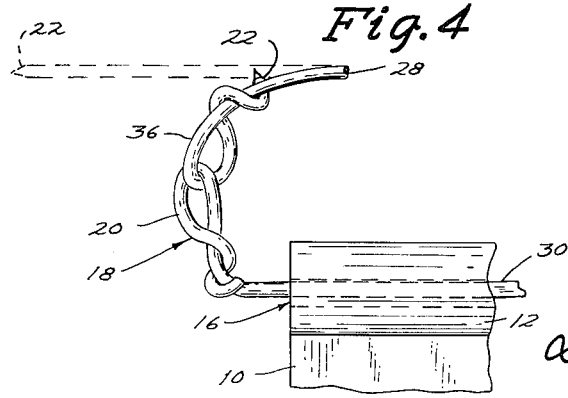
INVENTOR
RAYMOND K. TRINKLE
BY
Dick, Zarley & Henderson
ATTORNEYS

3,205,602
ANIMAL MARKING DEVICE AND METHOD OF APPLYING SAME
Raymond K. Trinkle, 1333 2nd St., Webster City, Iowa
Filed Nov. 5, 1962, Ser. No. 235,401
2 Claims. (Cl. 40—300)

Since the early history of our country, the marking of animals, and cattle in particular, has been an important operation. Branding the animals now is undesirable because the animal hides are then damaged for further use. Marking clips have been placed on the ears of animals, but the animals are capable of rubbing these clips on posts and the like whereby the clips become removed. Tags have been placed on chains about the animals' necks, but many animals succeed in catching the chains on obstructions, and the chains are ultimately broken or the animal hangs itself. In addition, these chain tags often become dirty, and the chain and tag on a given animal often become frozen to the ground while the animal is lying down. Thus, while the need for marking animals has increased because of the necessity of keeping records on individual animals for tax, breeding, and feeding purposes, the art of marking animals has not kept pace with the times.

Therefore, a principal object of my invention is to provide a marking device for animals that will be substantially permanent and which will not be removed by any action of the animals.

A still further object of my invention is to provide a marking device for animals which can be easily and painlessly secured to the animals.

A still further object of my invention is to provide a marking device that will not readily become dirty and which can be easily observed.

A still further object of my invention is to provide a marking device that will not harm the animal insofar as processing of the animal byproducts is concerned.

A still further object of my invention is to provide a method of marking animals that is sanitary and which will not make the animal subject to infection and disease.

A still further object of my invention is to provide a marking device for animals that is economical of manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIGURE 1 is a perspective view of my device secured to the forehead of a cow;

FIGURE 2 is a front elevation of my device;

FIGURE 3 is a vertical sectional view of my device taken on line 3—3 of FIGURE 1; and FIGURE 4 is an enlarged fragmentary view of my device similar to a portion of that shown in FIGURE 2, but more fully illustrating the connecting means for the pin element.

My device includes a rectangular plate 10 comprised of plastic or the like which has a shoulder 12 extending from the upper edge 14 thereof at right angles to the plane of plate 10. An elongated bore 16 extends completely through plate 10 adjacent its upper edge 14 in a direction parallel to the upper edge. An elongated pin or wire 18 has a loop 20 formed in one of its ends, and the other end 22 can be tapered to a substantially sharp point. Pin 18 is of stainless steel or similar material that will not readily rust or corrode. The length of pin 18 should be greater than twice the length of plate 10. End 22 of pin 18 is then inserted into and through the bore 16 in plate 10.

I have used the numeral 24 to designate the skull bone at the forehead of a cow and the numeral 26 designates the hide that extends over the bone structure. To secure my device to a cow, the pin 18 is inserted through the bore 16 of plate 10 in the manner described above. Then, the protruding portion of the pin opposite to loop 20 is bent upwardly and thence downwardly at 26' so that the portion 28 of the pin is parallel to the portion 30 inside bore 16 of plate 10. The portion 28 of pin 18 then extends back toward loop 20.

The sharpened end 22 of pin 18 is then inserted through the hide 26 of the animal on the forehead thereof at point 32, and is forcibly moved between the hide and the skull 24 where it is allowed to again penetrate the hide at point 34. The end 22 can then be inserted through loop 20, and can then be wrapped around itself to form a loop 36. This operation is substantially painless for the animal.

Obviously, my marking device will always be in plain view and will not normally become dirty or soiled. Appropriate indicia marks or numerals 38 are placed on the outer surface of plate 10 underneath shoulder 12. These numerals are preferably imbedded in plate 10 but can be secured thereto in any manner which will insure their permanent attachment to the plate.

As shown in FIGURES 1 and 3, the pin 18 hangs downwardly from portion 28 and the plate 10 hangs downwardly from portion 30 of the pin. The plate 10 is rotatable with respect to this portion 30 of pin 18. This feature is helpful in manipulating the unit when it is being secured to the animal, and it also permits a certain degree of free deflection of the plate without causing the animal pain. However, if the animal seeks to rub the plate against a post or the like, pressure will be exerted on hide 26 by the portion 28 of pin 18. In addition, as the plate 10 is rotated upwardly on portion 30 of pin 18, the shoulder 12 will engage the hide 26 and exert a leverage on pin 18. This will pain the animal and will cause the animal to stop the rubbing action. The shoulder 12 also induces the plate 10 to rotate on pin 18 when the animal starts to rub the plate and shoulder on objects, and since a predetermined amount of rotation of the plate will induce pain, the animal will be inclined to stop the rubbing activity. In effect, the shoulder 12 serves as a bumper to make the plate 10 more sensitive to movement if the plate is rubbed against an object by the animal.

The stainless steel pin 18 will not rust or corrode and serves to prevent any infection from taking place in the area that the pin extends beneath the animal's hide. The forehead of the animal is especially suitable for my marking device since the hide is substantially adjacent the bone structure whereby the pin 18 is not required to pierce the flesh of the animal. In addition, it is difficult for the animal to rub its forehead on foreign objects.

Thus, from the foregoing, it is seen that my device will accomplish at least all of its stated objectives.

Some changes may be made in the construction and arrangement of my animal marking device and method of applying same without departing from the real spirit and purpose of my invention, and it is my intention to cover by my claims any modified forms of structure or use of mechanical equivalent which may be reasonably included within their scope.

I claim:

1. In a device for marking animals, comprising in combination,
    a plate normally disposed in a vertical position and adapted for placing indicia thereon,
    a shoulder element extending outwardly at a right angle from the upper portion of said plate, said plate having an elongated bore in its upper portion inwardly from said shoulder element,
and an elongated pin having a tapered point on one of its ends and a loop member on its opposite end,
said elongated pin extending through said elongated bore, then upwardly and back towards its point of beginning.

2. In a device for marking animals,
a rectangular plate normally disposed in a vertical position and adapted for placing indicia thereon,
a shoulder element extending outwardly at a right angle from the upper end of said plate,
said shoulder element having a rounded outer end,
said plate having an elongated bore in its upper end inwardly from said shoulder element,
an elongated pin having a tapered point on one of its ends and a loop member on its opposite end,
said elongated pin extending through said elongated bore, thence upwardly and back towards its point of beginning,
said pin being rotatable in said bore,
said pin being of a bendable material so that said tapered point of said pin can be forcibly intertwined with said loop member.

References Cited by the Examiner

UNITED STATES PATENTS

| | | | |
|---|---|---|---|
| 691,361 | 1/02 | Davis | 40—26 |
| 881,152 | 3/08 | Renshaw | 40—302 |
| 1,216,269 | 2/17 | Bates | 40—21 |
| 1,318,283 | 10/19 | Johnston | 40—300 |
| 2,594,623 | 4/52 | Dryden | 40—301 |
| 2,637,922 | 5/53 | Dryden | 40—21 X |
| 2,840,939 | 7/58 | McClure | 40—21 |

FOREIGN PATENTS 555,427   8/43   Great Britain.

JEROME SCHNALL, *Primary Examiner.*